United States Patent [19]

Kawabe et al.

[11] Patent Number: 4,718,685

[45] Date of Patent: Jan. 12, 1988

[54] MODEL SOLVING TYPE VEHICLE STEERING CONTROL SYSTEM WITH PARAMETER IDENTIFICATION

[75] Inventors: Taketosi Kawabe, Tokyo; Ken Ito, Yokohama, both of Japan

[73] Assignee: Nissan Motor Co., Ltd., Yokohama, Japan

[21] Appl. No.: 939,107

[22] Filed: Dec. 8, 1986

[30] Foreign Application Priority Data

Dec. 9, 1985 [JP] Japan .................................. 60-276590

[51] Int. Cl.$^4$ .............................................. B62D 5/00
[52] U.S. Cl. .................................... 280/91; 180/140; 180/142
[58] Field of Search .................... 280/91; 180/140, 142

[56] References Cited

U.S. PATENT DOCUMENTS

| | | | |
|---|---|---|---|
| 3,866,706 | 2/1975 | Lincke et al. | 180/142 |
| 3,897,846 | 8/1975 | Inoue | 180/142 |
| 4,412,594 | 11/1983 | Furukawa et al. | 180/140 |
| 4,418,780 | 12/1983 | Ito et al. | 180/142 |
| 4,441,572 | 4/1984 | Ito et al. | 180/140 |
| 4,456,087 | 6/1984 | Lang et al. | 180/142 |
| 4,476,529 | 10/1984 | Nakamura et al. | 364/424 |
| 4,518,055 | 5/1985 | Yagi et al. | 180/142 |
| 4,552,239 | 11/1985 | Kanazawa et al. | 180/140 |
| 4,597,462 | 7/1986 | Sand et al. | 180/140 |
| 4,598,788 | 7/1986 | Serizawa et al. | 180/140 |
| 4,601,357 | 6/1986 | Miyoshi et al. | 280/91 |

FOREIGN PATENT DOCUMENTS 55-79754 6/1980 Japan .
59-26366 2/1984 Japan .

Primary Examiner—John J. Love
Assistant Examiner—Kenneth R. Rice
Attorney, Agent, or Firm—Schwartz, Jeffery, Schwaab, Mack, Blumenthal & Evans

[57] ABSTRACT

A control system for a controlled vehicle has a steering wheel angle sensor, a vehicle speed sensor, a turning behavior sensor such as a side speed sensor and a yaw rate sensor, an actuator such as a hydraulic system for altering a rear wheel steer angle in accordance with a desired angle value, and a controller such as a microcomputer for determining the desired angle value by solving three distinct vehicle models. The controller first solves a reference model representing a desired vehicle to determine a desired vehicle response to the steering wheel angle and vehicle speed, and then solves a first actual model representing the actual controlled vehicle to determine the desired rear wheel steer angle value required to cause the controlled vehicle to produce the desired response. The controller further solves a second actual vehicle model representing the controlled vehicle to estimate the turning behavior resulting from the desired rear wheel steer angle, identifies front and rear wheel cornering powers of the second actual model by comparing the estimated and sensing turning behavior, and then adjusts the front and rear wheel cornering powers gradually in accordance with the result of the identification.

13 Claims, 7 Drawing Figures

MODEL SOLVING TYPE VEHICLE STEERING CONTROL SYSTEM WITH PARAMETER IDENTIFICATION

CROSS REFERENCES TO RELATED APPLICATIONS

The following copending and commonly-assigned U.S. patent applications relate to subject matter similar to that of the present application. (1) Ser. No. 755,352; (2) Ser. No. 773,621; (3) Ser. No. 773,622; (4) Ser. No. 773,650; (5) Ser. No. 823,324; (6) Ser. No. 837,170; (7) Ser. No. 850,665; and (8) Ser. No. 883,719.

BACKGROUND OF THE INVENTION

1. Field of the Invention

The present invention relates to a vehicle steering control system for making vehicle response characteristics equal to desired response characteristics by varying a manipulated variable of a steering system such as a front wheel steer angle and/or a rear wheel steer angle, and more specifically to such a vehicle steering control system providing an optimum control performance by preventing abrupt change in vehicle behavior during a turn.

2. Description of Prior Art

In a conventional vehicle equipped with a mechanical steering linkage, the front wheels are steered in accordance with an angular displacement of the steering wheel. Therefore, the vehicle steering response characteristics are fixed by vehicle parameters which represent some characteristic properties or dimensions inherent in the vehicle. That is, the vehicle steering response characteristics are fixed by the make of the vehicle. Therefore, the possibility of improvement in steering response characteristics is very limited.

3. Description of Related Art

In the above-mentioned copending application Ser. Nos. 755,352, 773,650 and 773,622, for example, there are proposed vehicle steering control systems of a so-called model solving type in which a controller first solves a desired model simulating a motion of a desired vehicle by means of equations of vehicle motion and values of vehicle parameters to determine a desired value of a vehicle motion variable corresponding to a steering wheel angle and a vehicle speed, secondly solves an actual vehicle model representing an actual controlled vehicle to determine at least one of front and rear wheel steer angles requires to make the actual value of the motion variable of the controlled vehicle equal to the desired value, and controls the actual steer angle in accordance with the desired steer angle value. The control systems of this type can control the vehicle response characteristic freely.

In order to perform the vehicle steering control more accurately, the control system of the above-mentioned copending application No. 837,170 is arranged to sense the vehicle motion variable which is relatively easy to sense, with a sensor, and feed back the sensed motion variable value. In this system, the actual vehicle model is modified by a so-called parameter identification process so as to make the vehicle motion variable of the actual model equal to the sensed motion variable value. However, the arrangement performing the parameter identification in a real time manner tends to deteriorate the control and stability of the vehicle by changing the characteristics of the actual model abruptly during a turning motion of the vehicle.

SUMMARY OF THE INVENTION

It is an object of the present invention to provide a vehicle steering control system which can control vehicle steering response characteristics freely in an accurate and stable manner.

According to the present invention, a control system for steering a controlled vehicle having at least first and second wheels such as front and rear wheels, comprising; (i) means for sensing a steering wheel angle of the controlled vehicle and determining a sensed value of the steering wheel angle, (ii) means for sensing a vehicle speed of the controlled vehicle and determining a sensed value of the vehicle speed, (iii) means for sensing a turning behavior of the controlled vehicle by sensing a first vehicle motion variable, such as a vehicle side speed and a yaw rate, representing the turning behavior, and determining a sensed value of the first vehicle motion variable, (iv) actuating means for steering the controlled vehicle by altering at least a first wheel steer angle of the first wheels in accordance with a desired value of the first wheel steer angle, and (v) controlling means, such as a microcomputer, connected with the three sensing means for determining the desired value of the first wheel steer angle. The controlling means comprises; (i) target turning behavior determining means, (ii) steer angle determining means, (iii) actual turning behavior estimating means, (iv) parameter identifying means, and (v) parameter adjusting means. The target turning behavior determining means is connected with the steering wheel angle sensing means and the vehicle speed sensing means, and determines a desired value of a second vehicle motion variable corresponding to a vehicle steering response with respect to the sensed values of the steering wheel angle and vehicle speed by solving a desired vehicle model simulating a motion of a desired vehicle defined by values of vehicle parameters. The second motion variable may or may not be the same as the first motion variable. The steer angle determining means is connected with the target behavior determining means, and determines the desired value of the first wheel steer angle which satisfies a requirement for achieving the desired value of the second motion variable in the controlled vehicle, b solving a first actual vehicle model representing the controlled vehicle by using values of the vehicle parameters including a first vehicle parameter such as a first wheel cornering power and a second wheel cornering power.

The actual turning behavior estimating means is connected with the steer angle determining means, and determines an estimated value of the first motion variable resulting from the desired value of the first wheel steer angle by solving a second actual vehicle model simulating a motion of the controlled vehicle by use of values of the vehicle parameters including the first vehicle parameter. The parameter identifying means is connected with the turning behavior sensing means, modifies the second actual vehicle model by adjusting the value of the first vehicle parameter of the second actual model so that the estimated value of the first motion variable determined according to the second actual model approaches to the sensed value of the first motion variable, and by so doing, determines a desired value of the first vehicle parameter. The parameter adjusting means modifies the first actual model by adjusting the value of the first vehicle parameter of the first actual model so as to approache to the desired value of the first vehicle parameter.

In this control system, the first actual vehicle model is modified indirectly. First, the parameter identification of the second actual model of the actual turning behavior estimating means is performed, and then the parameter adjustment of the first actual model is performed in accordance with the result of the parameter identification. Therefore, the control system can prevent an abrupt change of the vehicle behavior even if the characteristics of the first actual vehicle model of the steer angle determining means are considerably different from the actual characteristics of the controlled vehicle.

DETAILED DESCRIPTION OF THE INVENTION

Figure 1:
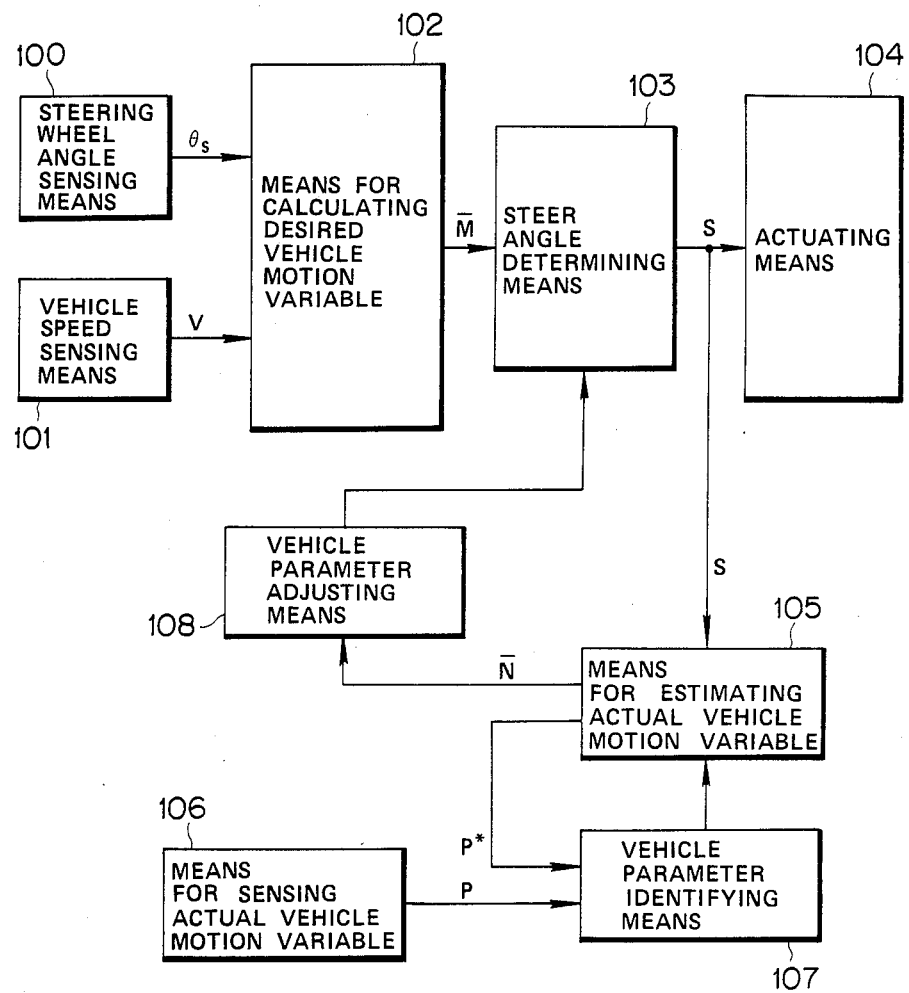
FIG. 1 is a schematic view of a control system of the present invention.

A control system of the present invention comprises nine means 100-108, as shown in FIG. 1.

Figure 2:
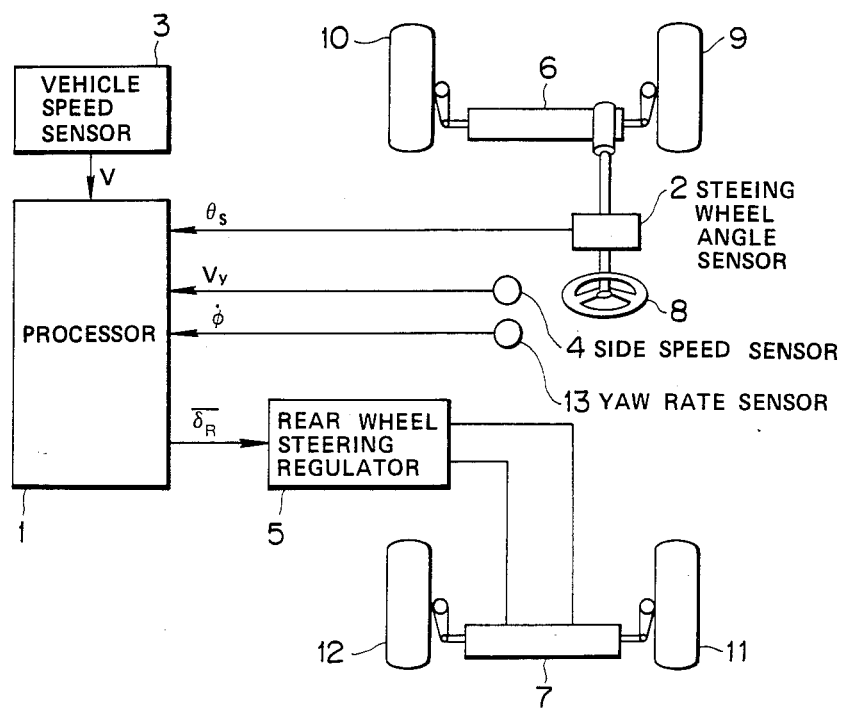
FIG. 2 is a schematic view a vehicle showing one embodiment of the present invention.

One embodiment of the present invention is shown in FIG. 2. A control system of FIG. 2 is mounted on a controlled vehicle.

A processor 1 is made up of a microcomputer or other electric circuitry, and connected with (i) a steering wheel angle sensor Z for sensing an angular displacement $\theta_s$ of a steering wheel 8 of the controlled vehicle, (ii) a vehicle speed sensor 3 for sensing a vehicle speed V of the controlled vehicle, (iii) a side speed sensor 4 for sensing a side speed $V_y$ of the controlled vehicle, and (iv) a yaw rate sensor 13 for sensing a yaw rate $\dot{\phi}$ of the controlled vehicle. The processor 1 receives these four input variables $\theta_s$, V, $V_y$ and $\dot{\phi}$ from the sensors 2, 3, 4 and 13, processes these input variables, and outputs a desired rear wheel steer angle value $\overline{\delta_R}$.

Front wheels 9 and 10 of the controlled vehicle are steered by a front wheel steering unit 6 of a conventional mechanical steering linkage type. The front wheel steering unit 6 alters a front wheel steer angle of the front wheels 9 and 10 in accordance with the angular displacement of the steering wheel 8.

Rear wheels 11 and 12 are steered by a rear wheel steering unit 7 of a hydraulic type. The rear wheel steering unit 7 is controlled by a rear wheel steering regulator 5. The r.w. steering regulator 5 receives the desired r.w. steer angle value $\overline{\delta_R}$ from the processor 1, and varies a fluid pressure supplied to the r.w. steering unit 7 in accordance with the desired r.w. steer angle value $\overline{\delta_R}$. In this way, an actual rear wheel steer angle of the rear wheels 11 and 12 are controlled in accordance with the desired r.w. steer angle value $\overline{\delta_R}$. A U.S. patent application Ser. No. 773,650 filed on Sept. 9, 1985 and a corresponding West German Offenlegungsschrift No. 35 32 247 disclose more in detail an arrangement of rear wheel steering regulator and unit of the same type.

The side speed sensor 4 may be an optical type ground speed sensor which is mounted so that the measuring direction of the sensor extends along the lateral direction of the vehicle. A yaw rate gyro is a typical example of the yaw rate sensor 13.

Figure 3:
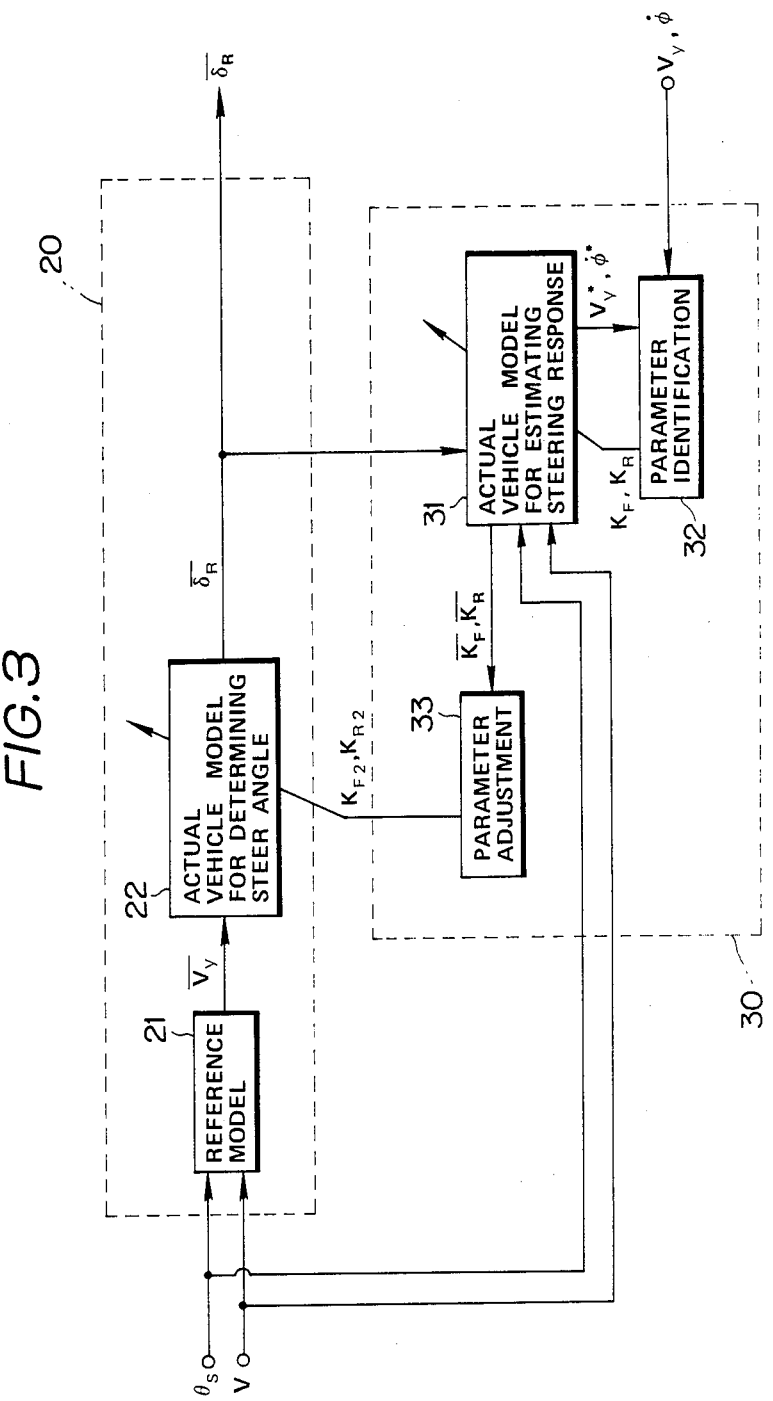
FIG. 3 is a block diagram showing the functions of a processor shown in FIG. 2.

FIG. 3 shows the composition of the processor 1 in terms of functional blocks.

The processor 1 has a section 20 for determining a desired rear wheel angle value, and a section 30 for adjusting one or more parameters of the section 20. The desired steer angle value determining section 20 performs a steer angle control to provide the controlled vehicle with a desired cornering characteristics by controlling the rear wheel steer angle of the rear wheels 11 and 12. The parameter adjusting section 30 adjusts one or more parameters of the section 20 to improve the accuracy of the steer angle control of the section 20 by feeding back the sensed yaw rate value $\dot{\phi}$ and the sensed sides speed value $V_y$.

The desired steer angle value determining section 20 has a subsection 21 for solving a reference vehicle model, and a subsection 22 for solving a first actual vehicle model. The reference vehicle model is a simulation model representing a desired vehicle having desired cornering characteristics by means of vehicle parameters and equations of vehicle motion. The sensed steering wheel angle value $\theta_s$ determined by the steering wheel angle sensor 2 and the sensed vehicle speed value V determined by the vehicle speed sensor 3 are inputted into the reference model. The reference model can predict the vehicle motion resulting from the sensed steering wheel angle value $\theta_s$ and the sensed vehicle speed value V, according to the desired cornering characteristics. In this embodiment, the value of the side speed of the desired vehicle corresponding to $\theta_s$ and V is determined, and outputted as a desired side speed value $\overline{V_y}$.

The first actual vehicle model of the subsection is a simulation model representing the controlled vehicle by means of vehicle parameters and equations of vehicle motion. The desired side speed value $\overline{V_y}$ determined by the reference model is inputted into the first actual model, which determines a rear wheel steer angle value required to achieve the desired side speed value $\overline{V_y}$ in the controlled vehicle, and delivers the thus-determined steer angle value as a desired rear wheel steer angle value $\overline{\delta_R}$.

The parameter adjusting section 30 has a subsection 31 for solving a second actual vehicle model, a subsection 32 for parameter identification, and a subsection 33 for parameter adjustment.

The second actual vehicle model is a simulation model distinct from the first actual vehicle model. However, the second actual model represents the controlled vehicle by means of vehicle parameters and equations of vehicle motion, like the first actual model. The desired rear wheel steer angle value $\overline{\delta_R}$ determined by the first actual model 22 is inputted into the second actual model 31. The second actual model estimates the steering response of the controlled vehicle to the desired rear wheel steer angle value $\overline{\delta_R}$. In this embodiment, the second actual vehicle model of the subsection 31 estimates the side speed and the yaw rate of the controlled vehicle resulting from steering the rear wheels of the controlled vehicle to the desired rear wheel steer angle value.

The parameter identifying subsection 32 varies the values of the vehicle parameters of the second actual vehicle model so as to make estimated side speed value $V_y^*$ and estimated yaw rate value $\dot{\phi}^*$ outputted from the second actual model of the subsection 31, approximately equal to the sensed side speed value $V_y$ and the sensed yaw rate value $\dot{\phi}$, respectively. In this embodiment, the vehicle parameters of the second actual model adjusted by the parameter identifying subsection 32 are a front wheel cornering power $K_F$ and a rear wheel cornering power $K_R$. The parameter identifying subsection 32 changes the dynamic characteristics of the second actual model so as to minimize the difference from the actual dynamic characteristics of the actual controlled vehicle, by varying the values of the parameters $K_F$ and $K_R$ of the second actual model.

The parameter adjusting subsection 33 adjusts the values of the front wheel cornering power $K_{F2}$ and the rear wheel cornering power $K_{R2}$ of the first actual vehicle model 22 so as to make the values of $K_{F2}$ and $K_{R2}$ to approach, respectively, to the values of the front wheel and rear wheel cornering powers $K_F$ and $K_R$ of the second actual model 31, obtained as the result of the parameter identification. The parameter adjusting subsection 33 is arranged to prevent an abrupt change of the dynamic characteristics of the first actual vehicle model of the subsection 22 by gradually adjusting the values of the parameters $K_{F2}$ and $K_{R2}$ of the first actual model. The parameter adjusting subsection 33 is further arranged to allow the parameter adjustment of $K_{F2}$ and $K_{R2}$ only when the controlled vehicle is in a straight motion, in oder to prevent the directional control of the vehicle from becoming unstable due to a change of the cornering characteristics during a cornering motion.

In this way, the parameter adjusting section 30 does not adjust the parameters of the first actual model directly, but modifies the characteristics of the first actual model more smoothly by first identifying the parameters of the second actual model, and then adjusting the parameters of the first actual model gradually in accordance with the result of the parameter identification.

Figure 4:
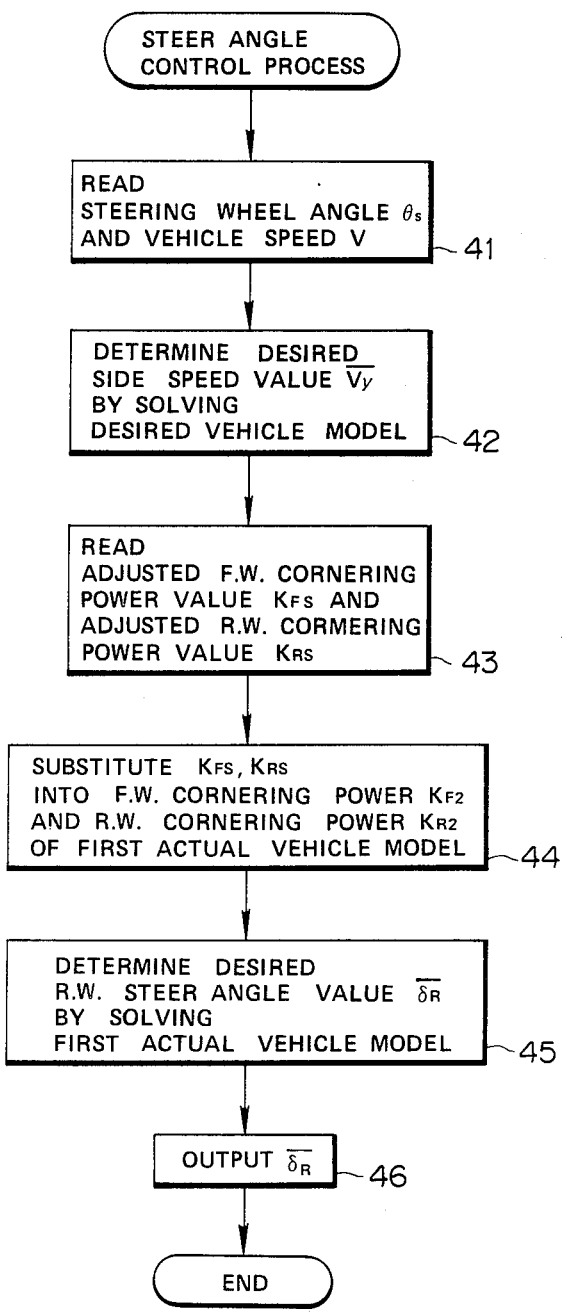
FIGS. 4-6 are flow charts showing processes performed by the processor of FIG. 2.
Figure 5:
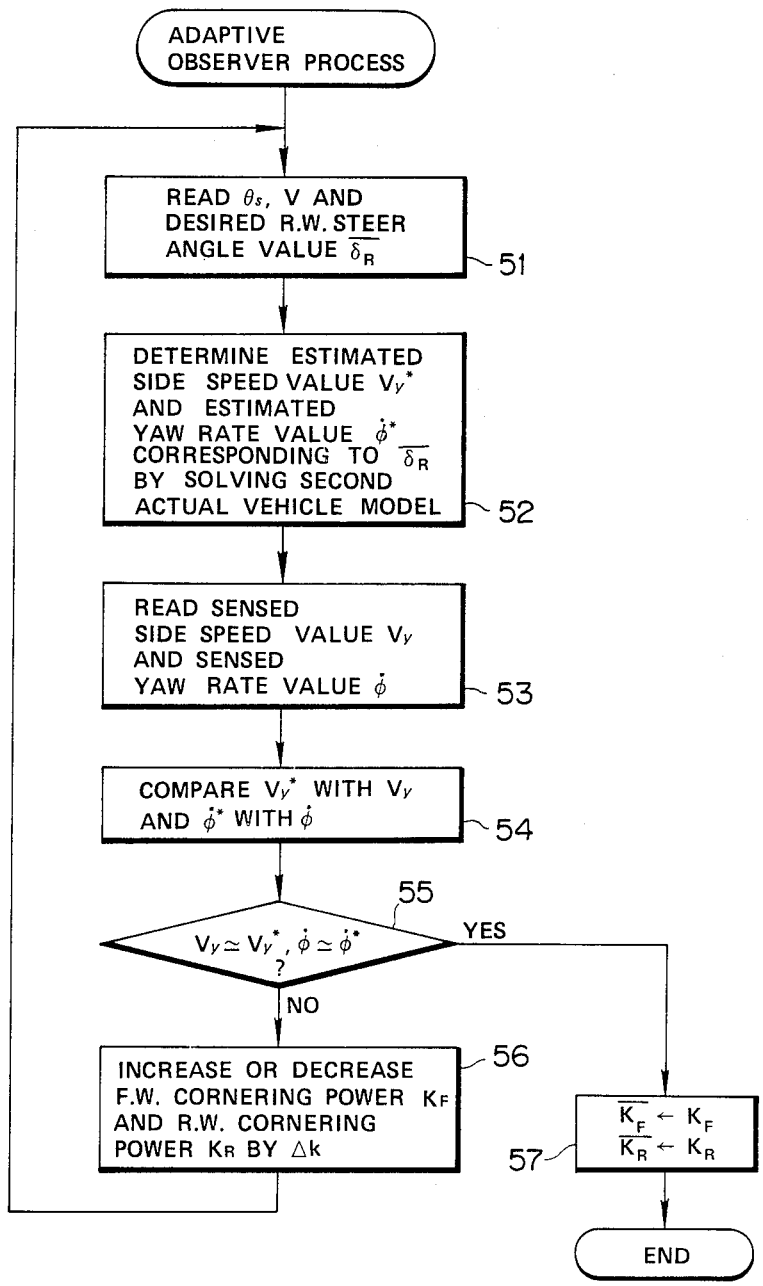
Figure 6:
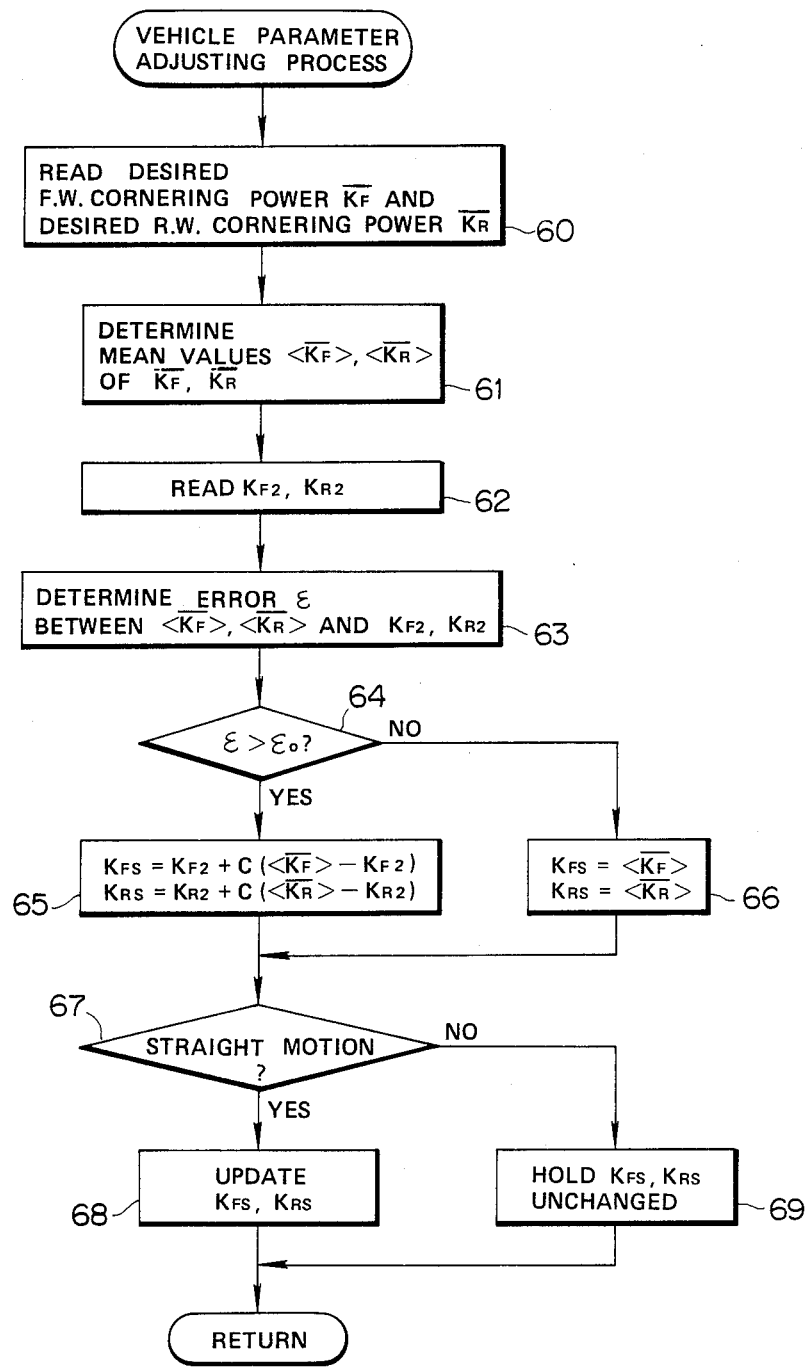

FIGS. 4-6 are flowcharts showing processes performed by the processor 1 when the processor 1 is a microcomputer.

A steer angle control process of FIG. 4 corresponds to the function of the desired steer angle value determining section 20 shown in FIG. 3. At a step 41, the processor 1 reads the steering wheel angle $\theta_s$ sensed by the sensor 2, and the vehicle speed V sensed by the sensor 3.

At a step 42, the processor 1 predicts theoretically a turning motion of the desired vehicle of the reference model, resulting from the steering wheel $\theta_s$ and the vehicle speed V. That is, the processor 1 determines a value of at least one vehicle motion variable representing a vehicle turning behavior by using the steering wheel angle $\theta_s$ and the vehicle speed V according to the reference model. In this embodiment, the processor 1 determines the desired side speed value $\overline{V_y}$ by solving the following equations.

$$M_1(\dot{V}_{y1}+\dot{\phi}_1 V)=2C_{F1}+2C_{R1} \quad (1)$$

$$I_{Z1}\ddot{\phi}_1=2L_{F1}C_{F1}-2L_{R1}C_{R1} \quad (2)$$

$$C_{F1} = K_{F1} \cdot \frac{\theta_s}{N_1} - (V_{y1} + L_{F1}\dot{\phi}_1)/V \quad (3)$$

$$C_{R1}=-K_{R1}(V_{y1}-L_{R1}\dot{\phi}_1)/V \quad (4)$$

$$\overline{V}_y = V_{y1} \quad (4)$$

In the equations (1)-(5), there appear the following vehicle parameters;

$I_{Z1}$: a yawing moment of inertia of the desired vehicle model, $M_1$: a mass of a vehicle body of the desired vehicle model, $L_{F1}$: a distance between a front axle and a center of gravity of the desired vehicle model, $L_{R1}$: a distance between a rear axle and the center of gravity of the desired vehicle model, $N_1$: a steering gear ratio (overall steering ratio) of the desired vehicle model, $K_{F1}$: a front wheel cornering power of the desired vehicle model, $K_{R1}$: a rear wheel cornering power of the desired vehicle model.

Variables appearing in the equations (1)-(5) are;

$V_{y1}$: a side speed of the desired vehicle model in the y-direction, $\dot{V}_{y1}$: a side acceleration of the desired vehicle model in the y-direction, $C_{F1}$: a front wheel cornering force of the desired vehicle model, $C_{R1}$: a rear wheel cornering force of the desired vehicle model.

The processor 1 solves these equations (1)-(5) by treating the vehicle parameters as constants and the variables including the steering wheel angle $\theta_s$ and the vehicle speed as variables varying with time, and employing an appropriate method of integration according to the required accuracy of integration.

At a step 43, the processor 1 reads an adjusted front wheel cornering power value $K_{FS}$ and an adjusted rear wheel cornering power value $K_{RS}$ determined by a process shown in FIG. 6. At a step 44, the processor 1 enters $K_{FS}$ and $K_{RS}$ obtained at the step 43, respectively, into a front wheel cornering power $K_{F2}$ and a rear wheel cornering power $K_{R2}$ of the controlled vehicle.

At a step 45, the processor 1 determines the desired rear wheel steer angle value $\overline{\delta_R}$ required to achieve the desired side speed value $\overline{V_y}$ obtained at the step 42, in the controlled vehicle, by using the values of the front and rear wheel cornering powers $K_{F2}$ and $K_{R2}$ obtained at the step 44. The desired rear wheel steer angle value $\overline{\delta_R}$ is obtained by substituting the desired side speed value $\overline{V_y}$ into the side speed of the first actual vehicle model representing the controlled vehicle, and solving the equations of motion of the first actual model for the rear wheel steer angle.

In this way, the characteristics of the first actual vehicle model are adjusted by using the adjusted front wheel cornering power value $K_{FS}$ and the adjusted rear wheel cornering power value $K_{RS}$ as the values of the front wheel and rear wheel cornering powers $K_{F2}$ and $K_{R2}$ of the first actual vehicle model.

The desired rear wheel steer angle value $\overline{\delta_R}$ is determined by using the following equations.

$$I_{K2}\ddot{\delta}_{F2}=N_2K_{s2}(\phi_s-N_2\delta_{F2})-D_{K2}\dot{\delta}_F-2\xi_2C_{F2} \quad (6)$$

$$M_2(\dot{V}_{y2}+\dot{\phi}_2 V)=2C_{F2}+2C_{R2} \quad (7)$$

$$\beta_{F2}=\delta_{F2}-(\overline{V}_y+L_{F2}\dot{\phi}_2)/V \quad (8)$$

$$C_{F2}=K_{F2}\beta_{F2} \quad (9)$$

$$C_{R2} = (L_{F2}C_{F2} - \ddot{\phi}_2 I_{Z2})/L_{R2} \tag{10}$$

$$\beta_{R2} = C_{R2}/K_{R2} \tag{11}$$

$$\overline{\delta_R} = \beta_{R2} + (\overline{V}_y - L_{R2}\dot{\phi}_2)/V \tag{12}$$

In the equations (6)–(12), there appear the following vehicle parameters;

$I_{Z2}$: a yawing moment of inertia of the first actual vehicle model, $M_2$: a mass of a vehicle body of the first actual vehicle model, $L_2$: a wheel base of the first actual vehicle model, $L_{F2}$: a distance between a front axle and a center of gravity of the first actual vehicle model, $L_{R2}$: a distance between a rear axle and the center of gravity of the first actual vehicle model, $I_{K2}$: a moment of inertia about a kingpin of the first actual vehicle model, $K_{S2}$: a steering stiffness of the first actual vehicle model, $D_{K2}$: a viscosity coefficient of a steering system of the first actual vehicle model, $\xi$: a trail of the first actual vehicle model.

In the equations (6)–(12), there appear the following variables;

$\delta_{F2}$: a front wheel steer angle of the first actual vehicle model, $\dot{\phi}_2$: a yaw rate of the first actual vehicle model, $\ddot{\phi}_2$: a yaw acceleration of the first actual vehicle model, $\dot{V}_{y2}$: a side acceleration of the first actual vehicle model, $\beta_{F2}$: a front wheel side slip angle of the first actual vehicle model, $\beta_{R2}$: a rear wheel side slip angle of the first actual vehicle model, $C_{F2}$: a front wheel cornering force of the first actual vehicle model, $C_{R2}$: a rear wheel cornering force of the first actual vehicle model.

The processor 1 solves these equations (6)–(12) by treating the vehicle parameters as constants and the variables as variables varying with time, and employing an appropriate method of integration according to the required accuracy of integration.

At a step 46, the processor 1 delivers the thus-determined desired rear wheel steer angle value to the rear wheel steering regulator 5. In response to the output signal of the processor 1, the regulator 5 steers the rear wheels 11 and 12 by supplying the hydraulic steering unit 7 with the oil pressure to make the actual rear wheel steer angle of the rear wheels 11 and 12 equal to the desired rear wheel steer angle value.

Thus, the control system controls the rear wheel steer angle so that the response characteristics of the controlled vehicle become equal to the desired characteristics of the desired vehicle model.

The actual vehicle response characteristics of the controlled vehicle are affected by wear of a tire, change in coefficient of friction of a road surface, or change in load. Accordingly, there tend to appear a difference between the vehicle response characteristics of the first actual vehicle model used at the step 45, and the actual vehicle response characteristics of the actual controlled vehicle. The parameter adjusting section 30 shown in FIG. 3 is designed to reduce this difference. Procedures shown in Figs. 5 and 6 are performed in the parameter adjusting section 30.

An adaptive observer process shown in FIG. 5 corresponds to the subsections 31 and 32 of FIG. 3.

At a step 51, the processor 1 reads the steering wheel angle $\theta_S$, the vehicle speed V, and the desired rear wheel steer angle value $\overline{\delta_R}$ obtained at the step 45 of the steer angle control process.

At a step 52, the processor 1 estimates a turning motion of the controlled vehicle, resulting when the rear wheels 11 and 12 are steered to the desired rear wheel steer angle value $\overline{\delta_R}$. The processor 1 estimates the turning motion of the controlled vehicle by using the second actual vehicle model which is discrete from the first actual vehicle model. In this embodiment, the processor 1 estimates the side speed and the yaw rate of the controlled vehicle.

The second actual vehicle model is a model approximating the motion of the controlled vehicle by equations of motion having two degrees of freedom. In this embodiment, an estimated side speed value $V_y^*$ and an estimated yaw rate value $\dot{\phi}^*$ are determined from the desired rear wheel steer angle value $\overline{\delta_R}$, the steering wheel angle $\theta_s$ and the vehicle speed V, by using transfer characteristics expressed in the following equations.

$$\dot{\phi}^* = \frac{(2K_FL_{F2}M_2)s + (4K_FK_RL_2/V)}{P} \cdot \frac{\theta_s}{N} - \tag{13a}$$

$$\frac{(2K_RL_{R2}M_2)s + (4K_RK_F/V)}{P} \cdot \overline{\delta_R}$$

$$V_y^* = \frac{(2K_FI_Z)s + 4K_FK_RL_RL_2/V - 2K_FL_FM_2V}{P} \cdot \frac{\theta_s}{N} + \tag{13b}$$

$$\frac{(2K_RI_Z)s + 4K_FK_RL_FL_2/V + 2K_RL_RM_2V}{P} \cdot \overline{\delta_R}$$

where $$P = M_2I_{Z2}s^2 + 2/V\{M_2(K_FL_{F2} + K_RL_{R2}^2) + \tag{14}$$

$$I_{Z2}(K_F + K_R)\}s + 4K_FK_RL_2^2/V^2 -$$

$$2M_2(K_FL_{F2} - K_RL_{R2})$$

In the equations (13a), (13b), and (14), s: a Lapalace operator (differential operator), $K_F$: a front wheel cornering power of the second actual vehicle model, $K_R$: a rear wheel cornering power of the second actual vehicle model, N: a steering gear ratio (overall steering ratio) of the second actual vehicle model.

At a step 53, the processor 1 reads the sensed side speed value $V_y$ sensed by the side speed sensor 4, and the sensed yaw rate value $\dot{\phi}$ sensed by the yaw rate sensor 13.

At a step 54, the processor 1 compares the estimated side speed value $V_y^*$ with the sensed side speed value $V_y$, and compares the estaimated yaw rate value $\dot{\phi}^*$ with the sensed yaw rate value $\dot{\phi}$.

At a step 55, the processor 1 determines whether the estimated side speed value $V_y^*$ is approximately equal to the sensed side speed value $V_y$, and whether the estimated yaw rate value $\dot{\phi}^*$ is approximately equal to the sensed yaw rate value $\dot{\phi}$.

If at least one of the estimated side speed value $V_y$ and the estimated yaw rate value $\dot{\phi}^*$ is not equal to the sensed value, then the processor 1 proceeds to a step 56. At the step 56, the processor 1 varies the front wheel cornering power $K_F$ and the rear wheel cornering power $K_R$ of the second actual vehicle model by a predetermined quantity $\Delta k$. The processor 1 determines whether to add or subtract the predetermined quantity $\Delta k$ to or from the cornering powers $K_F$ and $K_R$, according to the answer of the question whether the sensed side speed value $V_y$ is greater or smaller than the estimated side speed value $V_y$ or whether the sensed yaw rate value $\dot{\phi}$ is greater or smaller than the estimated yaw rate value $\dot{\phi}^*$.

Then, the processor 1 executes the step 52 again by using the values of the front and rear wheel cornering powers $K_F$ and $K_R$ which have been just adjusted at the step 56, and institutes the comparisons of the step 54 by using the estimated side speed value $V_y^*$ and the estimated yaw rate value $\dot{\phi}^*$ which have been determined most recently at the step 52.

Thereafter, the processor 1 repeats the steps 51-56 until the estimated side speed value $V_y^*$ becomes approximately equal to the sensed side speed value $V_y$, and simultaneously the estimated yaw rate value $\dot{\phi}^*$ becomes approximately equal to the sensed yaw rate value $\dot{\phi}$. That is, the loop of the steps 51-56 are performed repeatedly until both of the following requirements are satisfied; $V_y \approx V_y^*$, and $\dot{\phi} \approx \dot{\phi}^*$.

In this way, the front wheel cornering power $K_F$ and the rear wheel cornering power $K_R$ of the second actual vehicle model are made equal to the actual front wheel cornering power and the actual rear wheel cornering power of the actual controlled vehicle, and accordingly, the response characteristics of the second actual vehicle model are made equal to the actual response characteristics of the actual controlled vehicle.

When both requirements $V_y \approx V_y^*$ and $\dot{\phi} \approx \dot{\phi}^*$ are satisfied, the processor 1 proceeds from the step 55 to a step 57. At the step 57, the values of the front and rear wheel cornering powers $K_F$ and $K_R$ obtained when both of the above-mentioned requirements are satisfied, are temporarily stored as a desired front wheel cornering power value $\overline{K_F}$ and a desired rear wheel cornering power value $\overline{K_R}$, respectively. The desired front and rear wheel cornering power values $\overline{K_F}$ and $\overline{K_R}$ are used as desired values in adjusting the front and rear wheel cornering powers $K_{F2}$ and $K_{R2}$ of the first actual vehicle model.

A vehicle parameter adjusting process shown in FIG. 6 corresponds to the parameter adjusting subsection 33 shown in FIG. 3.

At a step 60, the processor 1 reads the front and rear wheel cornering powers $K_F$ and $K_R$ of the second actual vehicle model, obtained by an identification of the adaptive obserber process of FIG. 5. That is, at the step 60, the processor 1 reads the desired front and rear wheel cornering power values $\overline{K_F}$ and $K_R$ are temporarily stored at the step 57 of FIG. 5.

At a step 61, the processor 1 determines a mean $<\overline{K_F}>$ of the desired front wheel cornering power value $K_F$ and a means $<\overline{K_R}>$ of the desired rear wheel cornering power value $\overline{K_R}$. The processor 1 repeats the step 60 at regular time intervals, and determines the means $<\overline{K_R}>$ which is an average of the desired front wheel cornering power values $\overline{K_F}$ obtained by a predetermined number of repetitions of the step 60, and the means $<\overline{K_R}>$ which is an average of the desired rear wheel cornering power values $\overline{K_R}$ obtained by the predetermined number of repetitions. These operations are shown in a simplified manner in FIG. 6.

At a step 62, the processor 1 reads the front and rear wheel cornering powers $K_{F2}$ and $K_{R2}$ of the first actual vehicle model.

At a Step 63, the processor 1 determines an error $\epsilon$ between the means $<\overline{K_F}>$, $<\overline{K_R}>$ and $K_{F2}$, $K_{R2}$, given by the following equation.

$$\epsilon = \sqrt{(K_{F2} - <\overline{K_F}>)^2 + (K_{R2} - <\overline{K_R}>)^2} \quad (15)$$

At a step 64, the processor 1 determines whether the error $\epsilon$ is greater than a predetermined value $\epsilon_o$ which is approximately equal to zero ($\epsilon_o \approx 0$). If the error $\epsilon$ is greater than the predetermined value $\epsilon_o$, then the processor 1 judges that the response characteristics of the first actual vehicle model are not in agreement with the characteristics of the actual controlled vehicle, and modifies the response characteristics of the first actual vehicle model according to this judgement, at a step 65. That is, the processor 1 determines the adjusted front wheel cornering power value $K_{FS}$ and the adjusted rear wheel cornering power value $K_{RS}$ by using the following equations;

$$K_{FS} = K_{F2} + C(<\overline{K_F}> - K_{F2}) \quad (16)$$

$$K_{RS} = K_{R2} + C(<\overline{K_R}> - K_{R2}) \quad (17)$$

where $o < C < 1$.

The parameter adjusting process of FIG. 6 is performed repeatedly at regular time intervals. Accordingly, the step 65 is repeated until the error $\epsilon$ becomes equal to or smaller than the predetermined value $\epsilon_o$. As a result, the value of $K_{FS}$ gradually approaches to the mean $<\overline{K_F}>$, and the value of $K_{RS}$ gradually approaches to the mean $<\overline{K_R}>$.

At a step 67, the processor 1 determines whether the controlled vehicle is in a straight line motion or not. For example, the processor 1 compares the estimated yaw rate value $\dot{\phi}^*$ with a predetermined value $\dot{\phi}_o^*$, and judges that the controlled vehicle in a straight motion if $\dot{\phi}^* < \dot{\phi}_o$. Steps 68 and 69 are arranged to allow updating of $K_{FS}$ and $K_{RS}$ only when the vehicle is in a straight motion ($\dot{\phi}^* < \dot{\phi}_o^*$), and to prevent updating of $K_{FS}$ and $K_{RS}$ when the vehicle is not in a straight motion. Therefore, the adjustment of the front and rear wheel cornering powers $K_{F2}$ and $K_{R2}$ of the first actual vehicle model is not performed while the vehicle is in a turning motion. The steps 67, 68 and 69 serve to prevent the vehicle behavior from being made unstable by change in the response characteristics of the first actual vehicle model during a turning motion of the vehicle.

Figure 7:
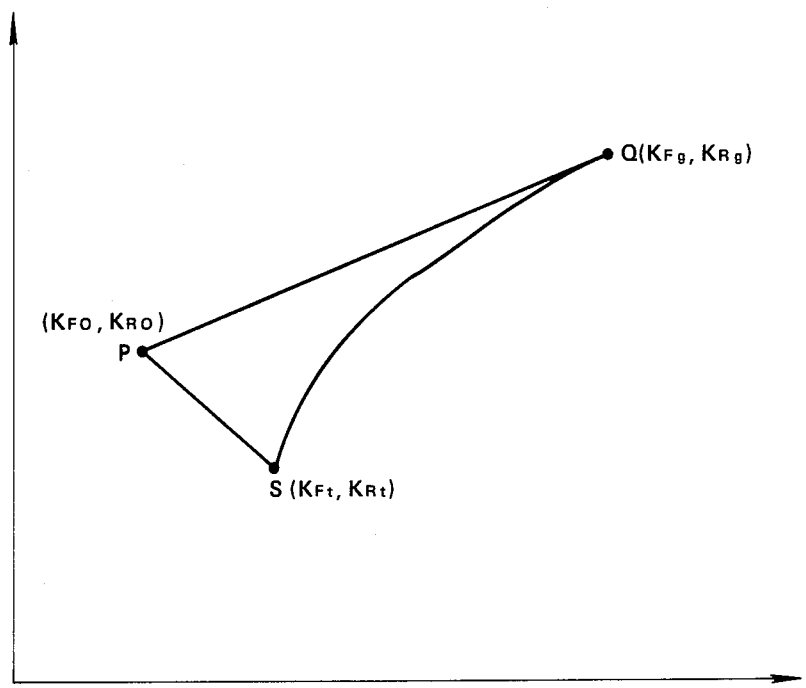
FIG. 7 is a graph showing operations of the embodiment of FIG. 2.

The effect of the control system of this embodiment is illustrated in FIG. 7. In the example of FIG. 7, at a given point of time, the values of the front and rear wheel cornering powers $K_{F2}$ and $K_{R2}$ of the first actual vehicle model are equal to values designated by a point P ($K_{FO}$, $K_{FO}$), and the actual values of the front and rear wheel cornering powers $K_{Fg}$ and $K_{Rg}$ are designated by a point Q.

If the first actual vehicle model is modified in a real time manner in accordance with the sensed vehicle motion variable, the front and rear wheel cornering powers $K_{F2}$ and $K_{R2}$ will be adjusted to a point S ($K_{Ft}$, $K_{Rt}$), and then adjusted toward the point Q. Therefore, in this example, the characteristics of the first actual vehicle model are changed suddenly, and the vehicle behavior controlled according to the first actual vehicle model becomes unstable.

The control system of the embodiment of the present invention adjusts the front and rear wheel cornering powers $K_F$ and $K_R$ of the second actual vehicle model along the course P-S-Q in the same manner. However, the control system of the embodiment adjusts the front and rear wheel cornering powers $K_{F2}$ and $K_{R2}$ of the first actual vehicle model little by little toward the point Q after the parameter identification of the second actual vehicle model has been completed, so that the front and rear wheel cornering powers of the first actual vehicle model are adjusted along a straight line from the point P to the point Q. Therefore, the control system of the embodiment can prevent the vehicle behavior from becoming unstable.

The speed of the parameter adjustment from the point P to the point Q can be adjusted by varying a number n of times (n is a natural number) for repeating the step 60 to determine the mean values $<\overline{K_F}>$ and $<\overline{K_R}>$, and varying the values of the coefficient C appearing in the equations (16) and (17). The speed of the parameter adjustment is increased when the number n is decreased, and the coefficient C is increased, and the speed of the parameter adjustment is decreased when the number n is increase and the coefficient C is decreased.

In the above-mentioned embodiment, the present invention is applied to a steering control system in which the rear wheel steer angle is controlled. However, the present invention is applicable to a steering control system controlling both of the front and rear wheel steer angles (such as one proposed by the above-mentioned U.S. application No. 773,650), a control system controlling a steering gear ratio (such as one proposed by the above-mentioned U.S. application No. 850,665, or one proposed by a Japanese patent application No. 60-73839), or a steering control system controlling a vehicle steering system in accordance with a vehicle speed (ground speed).

What is claimed is:

1. A control system for steering a controlled vehicle having first and second wheels, comprising:
    (i) means for sensing a steering wheel angle of said controlled vehicle, and determining a sensed value of said steering wheel angle,
    means for sensing a vehicle speed of said controlled vehicle, and determining a sensed value of said vehicle speed,
    (iii) means for sensing a turning behavior of said controlled vehicle by sensing a first vehicle motion variable representing the turning behavior, and determining a sensed value of said first vehicle motion variable,
    (iv) actuating, means for steering said controlled vehicle by altering a first wheel steer angle of said first wheels in accordance with a desired value of said first wheel steer angle, and
    (v) controlling means for determining said desired value of said first wheel steer angle, said controlling means comprising at least;
    (v-i) target turning behavior determining means connected with said steering wheel angle sensing means and said vehicle speed sensing means for determining a desired value of a second vehicle motion variable corresponding to a vehicle steering response with respect to said sensed value of said steering wheel angle and said sensed value of said vehicle speed by solving a desired vehicle model simulating a motion of a desired vehicle defined by values of vehicle parameters,
    (v-ii) steer angle determining means connected with said target turning behavior determining means for determining said desired value of said first wheel steer angle required to achieve said desired value of said second motion variable in said controlled vehicle by solving a first actual vehicle model representing said controlled vehicle by use of values of said vehicle parameters inclusive of a first vehicle parameter,
    (v-iii) actual turning behavior estimating means connected with said steer angle determining means for determining an estimated value of said first motion variable resulting from said desired value of said first wheel steer angle by solving a second actual vehicle model simulating a motion of said controlled vehicle by use of values of said vehicle parameters inclusive of said first vehicle parameter,
    (v-iv) parameter identifying means connected with said turning behavior sensing means for modifying only said second actual vehicle model by adjusting the value of said first vehicle parameter of said second actual vehicle model so that said estimated value of said first motion variable determined according to said second actual vehicle model approaches to said sensed value of said first motion variable, and thereby determining a desired value of said first vehicle parameter, and
    (v-v) parameter adjusting means for modifying said first actual vehicle model by adjusting the value of said first vehicle parameter of said first actual vehicle model so as to approach said desired value of said first vehicle parameter.

2. A control system according to claim 1, wherein said parameter adjusting means includes means for adjusting the value of said first vehicle parameter of said first actual vehicle model so that the value of said first vehicle parameter of said first actual vehicle model approaches gradually to said desired value of said first vehicle parameter.

3. A control system according to claim 2 wherein said parameter identifying means includes means for determining said desired value of said first vehicle parameter by an iterative method.

4. A control system according to claim 3 wherein said parameter identifying means includes means for repeating a cycle of operations of comparing said estimated value of said first vehicle motion variable with said sensed value of said first vehicle motion variable and adjusting the value of said first vehicle parameter of said second actual vehicle model until said estimated value of said first vehicle motion variable determined according to said second actual vehicle model by use of the value of said first vehicle parameter which has been adjusted in a previous iteration becomes approximately equal to said sensed value of said first motion variable.

5. A control system according to claim 4 wherein said parameter adjusting means includes means for adjusting the value of said first vehicle parameter of said first actual vehicle model only when said controlled vehicle is in a straight line motion.

6. A control system according to claim 5 wherein said parameter adjusting means includes means for adjusting, at regular time intervals, a current value of said first vehicle parameter of said first actual vehicle model to an adjusted value of said first vehicle parameter so that said adjusted value of said first vehicle parameter equals a sum of said current value of said first vehicle parameter and a product obtained by multiplying a difference between said desired value and said current value of said first vehicle parameter by a predetermined coefficient which is a constant greater than zero and smaller than one until an error between said desired value and said current value of said first vehicle parameter becomes equal to or smaller than a predetermined value.

7. A control system according to claim 5 wherein said parameter adjusting means includes means for determining a mean of said desired values of said first vehicle parameter which are obtained successively at regular time intervals, and adjusts, at regular time intervals, a current value of said vehicle parameter of said first actual vehicle model to an adjusted value of said first vehicle parameter so that said adjusted value of said first vehicle parameter equals a sum of said current value of said first vehicle parameter and a product obtained by multiplying a difference between said mean of said desired values of said first vehicle parameter and said current value of said first vehicle parameter by a predetermined coefficient which is a constant greater than zero and smaller than one until an error between said mean and said current value becomes equal to or smaller than a predetermined value.

8. A control system according to claim 7 wherein said vehicle parameters comprise a first wheel cornering power and a second wheel cornering power, and wherein said parameter identifying means includes means for modifying said second actual vehicle model by adjusting the values of said first and second wheel cornering powers and determining desired values of said first and second wheel cornering powers, and said parameter adjusting means includes means for modifying said first actual vehicle model by adjusting the values of said first and second wheel cornering powers.

9. A control system according to claim 8 wherein said parameter adjusting means includes means for determining a mean of said desired values of said first wheel cornering power which are obtained successively at regular time intervals and a mean of said desired values of said second wheel cornering power which are obtained successively at regular time intervals, and adjusts, at regular time intervals, a current value of said first wheel cornering power of said first actual vehicle model to an adjusted value of said first wheel cornering power so that said adjusted value of said first wheel cornering power equals a sum of said current value of said first wheel cornering power and a product obtained by multiplying a difference between said mean of said desired values of said first wheel cornering power and said current value of said first wheel cornering power by said predetermined coefficient, and a current value of said second wheel cornering power of said first actual vehicle model to an adjusted value of said second wheel cornering power so that said adjusted value of said second wheel cornering power equals a sum of said current value of said second wheel cornering power and a product obtained by multiplying a difference between said mean of said desired values of said second wheel cornering power and said current value of said second wheel cornering power by said predetermined coefficient until said error becomes equal to or smaller than said predetermined value, said error being equal to a square root of a sum of a square of a difference between said current value of said first wheel cornering power and said mean of said desired values of said first wheel cornering power and a square of a difference between said current value of said second wheel cornering power and said mean of said desired values of said second wheel cornering power.

10. A control system according to claim 9 wherein said turning behavior sensing means includes means for sensing a side speed and a yaw rate of said controlled vehicle and determines sensed values of said side speed and said yaw rate, and said actual turning behavior estimating means includes means for determining estimated values of said side speed and said yaw rate.

11. A control system according to claim 10 wherein said parameter identifying means includes means for repeatedly said estimated value of said side speed with said sensed value of said side speed and said estimated value of said yaw rate with said sensed value of said yaw rate, and adjusting the values of said first and second wheel cornering powers until said estimated value of said side speed determined according to said second actual vehicle model by use of the values of said first and second wheel cornering powers which have been adjusted in a previous iteration becomes approximately equal to said sensed value of said side speed, and at the same time said estimated value of said yaw rate determined according to said second actual vehicle model by use of the values of said first and second wheel cornering power which have been adjusted in the previous iteration becomes approximately equal to said sensed value of said yaw rate.

12. A control system according to claim 11 wherein said first wheels are rear wheels and said second wheels are front wheels.

13. A control system according to claim 1 wherein said desired vehicle model comprises a differential equation of a vehicle motion characteristic of said desired vehicle, and said first actual vehicle model comprises a differential equation of a vehicle motion characteristic of said controlled vehicle, and wherein said target determining means comprises integrating means for solving said differential equation characteristic of said desired vehicle, and said steer angle determining means comprises integrating means for solving said differential equation characteristics of said controlled vehicle.

* * * * *